(12) United States Patent
Brown (10) Patent No.: US 7,385,724 B2
(45) Date of Patent: Jun. 10, 2008

(54) PHOTO MANAGER

(75) Inventor: Rebecca Brown, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 985 days.

(21) Appl. No.: 10/400,036

(22) Filed: Mar. 26, 2003

(65) Prior Publication Data
US 2004/0190063 A1    Sep. 30, 2004

(51) Int. Cl.
*G06F 15/00*    (2006.01)

(52) U.S. Cl. .......... 358/1.18; 358/1.12; 428/195.1; 428/542.2; 428/542.8; 446/488; 493/356

(58) Field of Classification Search ........... 358/1.18, 358/1.12; 428/195.1, 542.2, 542.8; 446/488; 493/356
See application file for complete search history.

(56) References Cited

U.S. PATENT DOCUMENTS

| | | | | |
|---|---|---|---|---|
| 3,561,146 A * | 2/1971 | Dembar | .................. | 40/720 |
| 4,788,109 A * | 11/1988 | Mage | .................. | 428/542.8 |
| 5,018,764 A * | 5/1991 | Beardell | .................. | 281/2 |
| 6,029,383 A * | 2/2000 | Zappitelli | .................. | 40/720 |
| 6,117,061 A * | 9/2000 | Popat et al. | .................. | 493/325 |
| 6,248,426 B1 * | 6/2001 | Olson et al. | .................. | 428/195.1 |
| 6,311,418 B1 * | 11/2001 | Crowell | .................. | 40/124.08 |
| 6,505,858 B1 * | 1/2003 | Kirchmeyer et al. | .................. | 283/81 |
| 6,523,826 B1 * | 2/2003 | Matos | .................. | 273/155 |
| 6,545,674 B1 * | 4/2003 | Lin | .................. | 345/419 |
| 6,912,490 B2 * | 6/2005 | Dodge | .................. | 703/1 |
| 7,072,949 B1 * | 7/2006 | Safko | .................. | 709/219 |
| 2003/0097773 A1 * | 5/2003 | Oh | .................. | 40/124.08 |
| 2004/0037459 A1 * | 2/2004 | Dodge | .................. | 382/154 |

OTHER PUBLICATIONS

George Schaub, "3D Photo Album, Get Lively With Your Images" Jan./Feb. 2003, eDIGITALPHOTO.com (pp. 32 and 34).
Ulead Systems, Inc., Photo Express Scrapbook, Product Info, found at http://www.ulead.com/mse/faq.htm Oct. 29, 2002, (4 pgs.).
SmartDraw Photo-Easily Organize, Edit, View and Share Your Photos . . . found at http://www.smartdraw.com/specials/photo-album.asp?id=24209, Oct. 29, 2002 (2 pgs.).
Ulead Systems, Inc., Scrapbooking, "Your Complete Scrapbooking Software"found at http://scrapbooking.about.com/library/review s/aafprphotoexpress.htm, Oct. 29, 2002 (4 pgs.).

* cited by examiner

*Primary Examiner*—David K Moore
*Assistant Examiner*—Mark R Milia (57) ABSTRACT

A method of photo display comprises electronically selecting at least one photo from a memory and electronically arranging at least one electronic photo sheet template, including arranging the at least one photo on the template, into a manipulable configuration for producing a three-dimensional photo display.

15 Claims, 8 Drawing Sheets

PHOTO MANAGER

BACKGROUND OF THE INVENTION

Digital photography has spawned an entire industry including photo editing software, photo printers, photo web sites, digital cameras, and more. This digital revolution expands an already vibrant movement of scrapbooking, journaling, and photodisplay such as Creative Memories® photo albums. With these changes, a larger cross section of the population is becoming more interested in photography.

However, even with this digital advantage, consumers are still limited in many ways. For example, consumers largely obtain printed photos from local film processing centers, and then physically attach or insert the photos into photo, albums, frames, scrapbooks, and the like. Even with conventional photo editing software and photo printers, consumers continue to display photos in familiar ways. Photos may be edited by computer software and printed at home, but then are cut and pasted like ordinary photos into photo album pages, or inserted into album sleeves.

Accordingly, while a new frontier of digital photo media has been opened, this frontier leaves much to be explored.

SUMMARY OF THE INVENTION

One aspect of the present invention provides a method of photo display comprising electronically selecting at least one photo from a memory and electronically arranging at least one electronic photo sheet template, including arranging the at least one photo on the template, into a manipulable configuration for producing a three-dimensional photo display.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Components of the present invention may be implemented in hardware via a microprocessor, programmable logic, or state machine, in firmware, or in software within a given device. In one aspect, at least a portion of the software programming is web-based and written in Hypertext Markup Language (HTML) and JAVA programming languages, including links to graphical user interfaces, such as via windows-based operating system. The components may communicate via a network using a communication bus protocol. For example, the present invention may or may not use a transmission control protocol (TCP) and/or internet protocol (IP) suite for data transport. Other programming languages and communication bus protocols suitable for use with the present invention will become apparent to those skilled in the art after reading the present application. Components of the present invention may reside in software on one or more computer-readable media. The term computer-readable media as used herein is defined to include any kind of memory, volatile or non-volatile, such as floppy disks, hard disks, CD-ROMs, flash memory, read-only memory (ROM), and random access memory (RAM).

Preferably, the user interfaces, such as a web browser, described herein run on a controller, computer, appliance or other device having an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employs a graphical user interface windowing environment that presents the applications or documents in specially delineated areas of the display screen called "windows." The operating system preferably includes a windows-based dynamic display which allows for the entry or selection of data in dynamic data field locations via an input device such as a keyboard and/or mouse. One preferred operating system is a Windows® brand operating system sold by Microsoft Corporation. However, other operating systems which provide windowing environments may be employed, such as those available from Apple Corporation or IBM. In another embodiment, the operating system does not employ a windowing environment.

A system and method of the present invention is directed to electronically arranging photos with a computer and printing them as photo sheets for configuration as a three-dimensional photo display. This photo display is produced from a single printed photo sheet, or multiple printed photo sheets, with each sheet adapted for manipulation and/or aggregation into the three dimensional configuration. The photo configuration can be foldable, expandable or fixed, and can be embodied in a large variety of shapes and sizes. This system and method enables creative display of photos where sizing, shaping, orienting, and location of photos on a three-dimensional display is first performed electronically on one or more photo templates. The electronic templates are selected and arranged to produce a manipulable configuration of photo sheets (when printed from the templates) that have indicated portions for folding, cutting and/or attaching. Any desired inscriptions and/or graphics can be added electronically as a border, text window, and be inserted within, around, beside or instead of photos.

Once the photos are electronically arranged via the photo templates, a corresponding number, shape and size of printable photo sheets are printed according to the templates from the computer and printer. The printed photo sheets are folded or cut at the indicated markers, and then manipulated in combination (i.e., aggregated) into the selected configuration as a three-dimensional photo display. This aggregation optionally uses a three-dimensional object, onto which the photo sheets are secured in the desired pattern. Examples of a three-dimensional photo configuration produced by the system and method of the present invention include photo cubes, photo cylinders, as well as a foldable, collapsible and expandable mini-scrapbook, and more.

Figure 1:
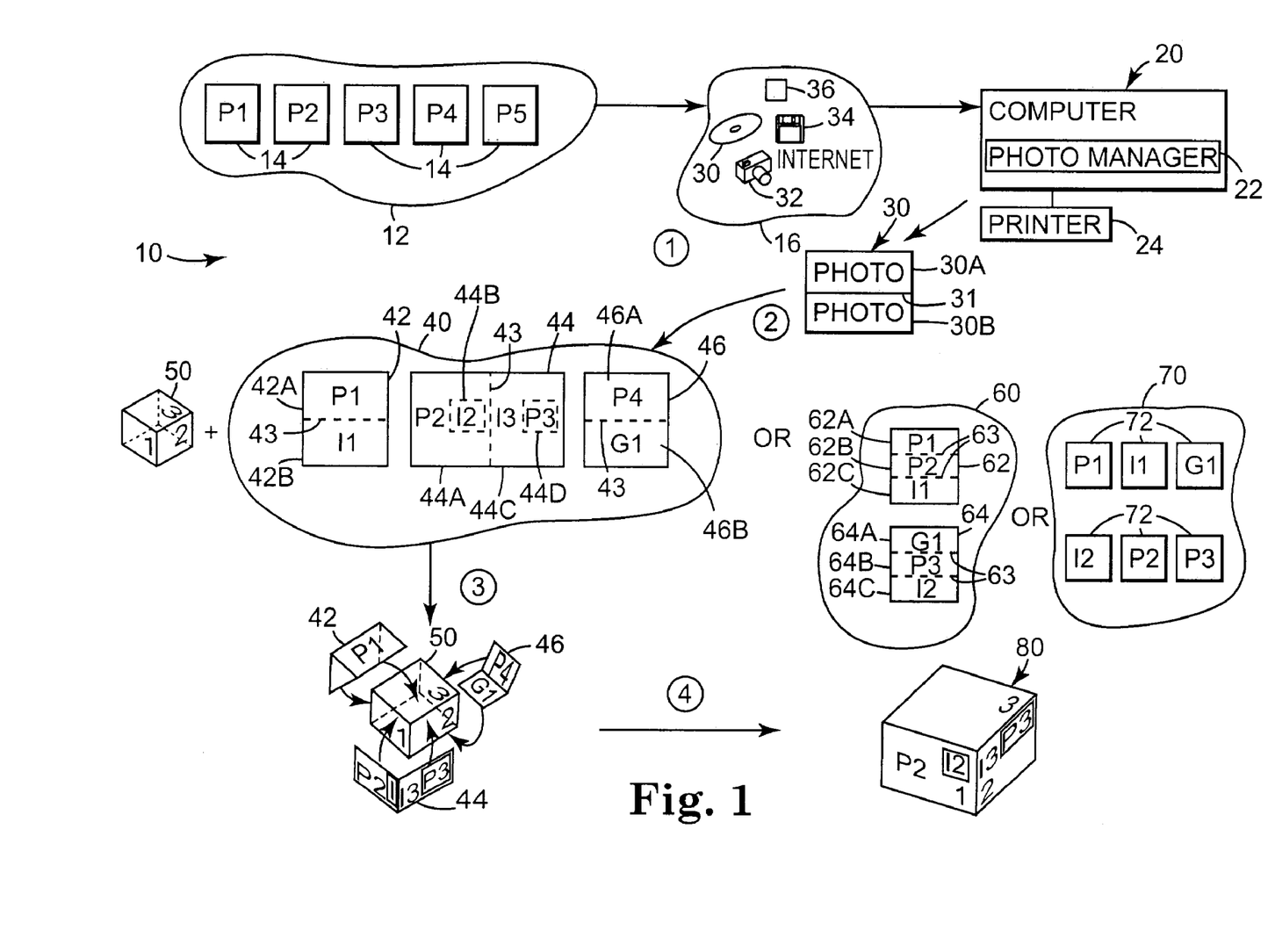
FIG. 1 is a diagram of a method of managing photos, according to an embodiment of the present invention.

In one exemplary embodiment of the present invention, a method for managing photos is illustrated in FIG. 1 generally at 10. As shown in FIG. 1, method 10 includes the use of set 12 of photos 14, photo media set 16, computer 20 with photo manager 22 and printer 24. Printer 24, via photo manager 22, produces set 40 of printed photo sheets 42, 44, and 46 from template 30 using photo set 12 (as shown by directional arrow 2). Alternatively, photo manager 22 and printer 24 produces set 60 of two photo sheets 62, 64, or produces set 70 of six printed photo sheets 72. As shown by directional arrow 1, photos 14 are taken with a camera (such as camera 32), stored in one of the media devices of photo media set 16, and then made available to photo manager 22 in computer 20.

Photo media set 16 includes one or more of CD-ROM 30, digital camera 32, floppy disk 34, photo memory card 36 or any other computer readable storage media for storing digital photos 14.

Computer 20 and photo manager 22 permit access and management of photos 14 for printing on printer 24, and will be later described in greater detail in association with FIG. 2.

Template 30 is an electronic photo template viewable through a user interface on computer 20 and is used for arranging photos 14 as they will be printed on photo sheets 42, 44, 46 (with or without inscriptions and/or graphics). Template 30 includes photo designates 30A, 30B, which identify a suggested location for electronic placement of photos 14 and includes fold line 31 which sets a suggested folding location of photo sheets 42, 44, 46. Photo designates 30A, 30B and fold line 31 of template 30 can be electronically manipulated into; different locations, shapes, and/or sizes by the user through user interface 110 (shown in FIG. 2) of computer 20.

Three-dimensional object 50, such as a cube, is selected and supplied by the user for use with set 40 of printed photo sheets 42, 44, and 46. Cube 50 has six faces, including faces 1, 2, and 3 which are visible in FIG. 1. Faces 4, 5, 6 are hidden from view. Any one of sets 40, 60, 70 of photo sheets can be combined with cube 50 to produce a three-dimensional photo cube 80 (shown as a final product). Each set 40, 60, 70 merely provides a different number of photo sheets for covering cube 50.

Sheet 42 of set 40 includes first portion 42A bearing photo P1 and second portion 42B bearing inscription I1. Sheet 44 of set 40 includes first portion 44A bearing a photo P2, second portion 44B bearing inscription I2, third portion 44C bearing inscription I3, and fourth portion 44D bearing photo P3. In sheet 44, second portion 44B of inscription I2 is nested within first portion 44A of photo P2 while fourth portion 44B of photo P3 is nested within third portion 44C of inscription I3. Sheet 46 of set 40 includes first portion 46A bearing photo P4 and second portion 46B bearing graphic G1. Each sheet 42, 44, 46 has fold line 43, at which the sheet will be later folded after printing, and which optionally includes a non-obtrusive marking for visual identification of fold line 43.

In another example, set 60 of sheets 62 is printed for covering cube 50 to yield a three-dimensional photo configuration. Sheet 62 includes first, second and third portions 62A, 62B, 62C with each bearing photos P1, P2, and inscription I1, respectively. Sheet 64 includes first, second and third portions 64A, 64B, 64C with each bearing graphic G1, photo P3, and inscription I2, respectively. Each sheet 62, 64 has a pair of fold lines 63 at which sheets 62, 64 will be later folded after printing, and which optionally includes a non-obtrusive marking for visual identification of fold line 63.

Each sheet 72 of set 70 bears a different photo, inscription, or graphic, such as photo P1, P2 or P3, inscriptions I1 and/or I2, and graphic G1, in any desired combination. However, each sheet 72 can bear an identical photo, graphic or inscription, or multiple sheets (e.g., 2 or 3 sheets) can bear the same photo, inscription, and/or graphic. Each sheet 72, or a portion of each sheet 72, is sized and shaped to substantially match the size and shape of a single face of cube 50.

The illustrated combination of photos for sets 40, 60, and 70 are merely exemplary with sheets 42, 44, 46, as well as sheets 62, 64 and 72, optionally bearing any combination of photos, graphics, and/or inscriptions, as produced by photo manager 22 in various selected shapes, sizes, locations and orientations.

Next (shown by arrow 3), method 10 includes set 40 of printed photo sheets 42, 44, 46 being applied to a three-dimensional object, such as cube 50. To do so, each printed photo sheet 42, 44, 46 is folded at fold line 43 to produce a half-folded sheet to form an approximate right angle between first portion 42A, 44A, 46A and second portion 42B, 44B, 46B of each sheet, respectively. With the printed photo sheets (42, 44, 46) in this folded configuration, set 40 of sheets 42, 44, 46 is applied to cube 50. In particular, as shown in FIG. 1, printed photo sheet 44 is applied to faces 1 and 2 of cube 50, while printed photo sheet 42 is applied to face 3 (e.g., top) and face 4 of cube 50 and printed photo sheet 46 is applied to face 5 and face 6 (e.g., bottom) of cube 50.

Upon application of printed photo sheets 42, 44, 46 to cube 50, three dimensional photo cube 80 is produced, which includes one or more photos, inscriptions, and/or graphics on each of its sides. However, any one side (or more) of cube 80 can omit a photo, graphic or inscription.

Alternatively, a user can use sets 60 of printed photo sheets 62, 64 to cover the entire cube 50. Sheets 62, 64 are folded at lines 63 so that each folded sheet 62, 64 is capable of covering three sides of cube 50. Each sub-portion 62A, 62B, 62C of sheet 62 is applied to a single face of cube 50, and each subportion 64A, 64B, 64C of sheet 64 is applied to a single face of cube 50, resulting all six sides of cube 50 being covered by photo sheets.

Finally, set 70 of printed photo sheets 72 can be applied with one sheet 72 applied to each face of cube 50 to render three-dimensional photo cube 80.

Figure 2:
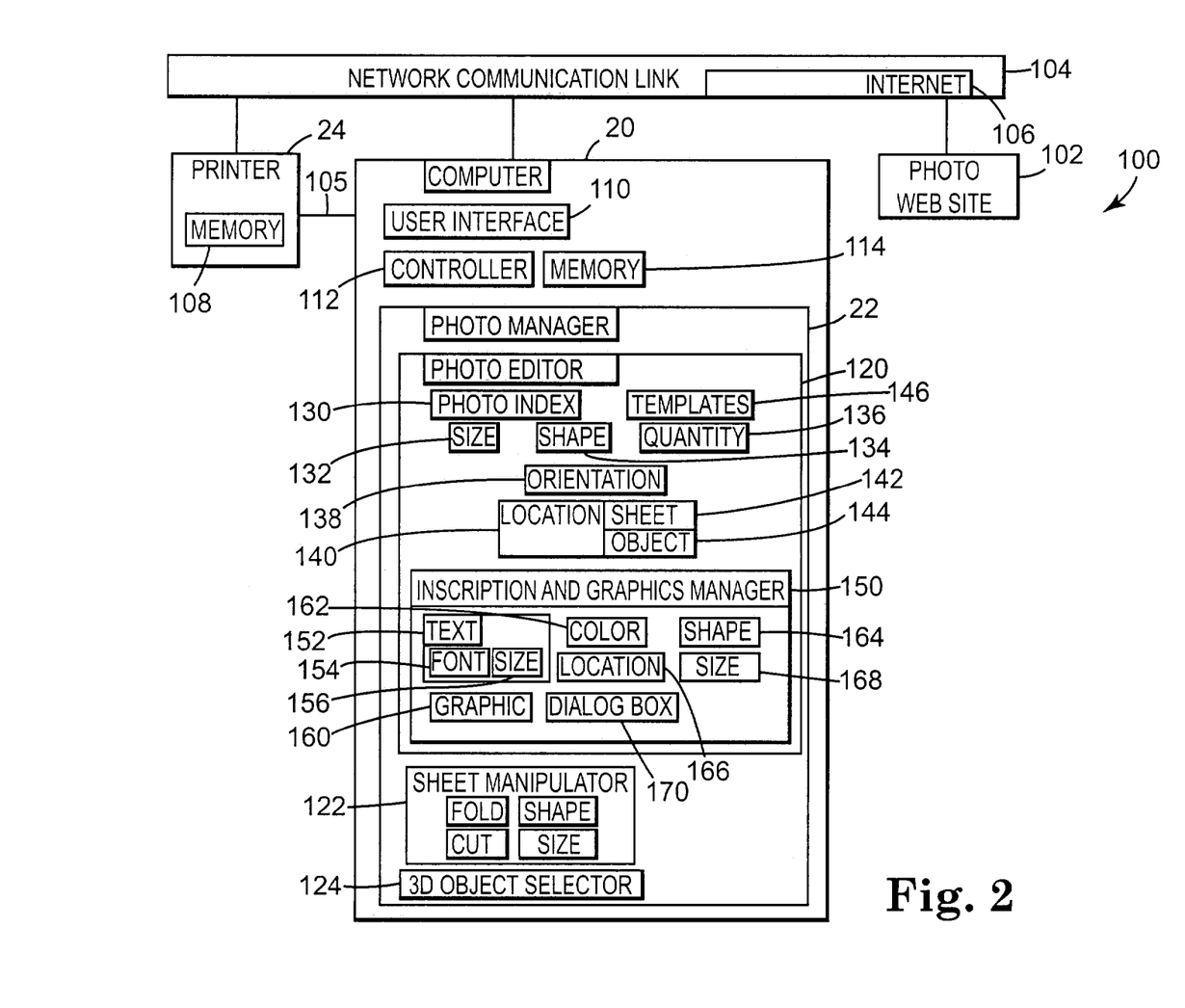
FIG. 2 is a block diagram of a photo manager system, according to an embodiment of the present invention.

As shown in FIG. 2, system 100 of the present invention includes computer 20 with photo manager 22, and printer 24, as well as photo web site 102 and network communication link 104. Printer 24 includes memory 108, while computer 20 includes user interface 110, controller 112, memory 114, and photo manager 22. Memory 114 holds, and/or is in communication with, photo manager 22.

Photo web site 102 provides photos to a consumer for downloading into, or receives photos from, photo manager 22 of computer 20 via network communication link 104. Network communication link 104, as used herein, includes an Internet communication link (e.g., the Internet), an intranet communication link, or similar high-speed communication link. In one preferred embodiment, network communication link 104 includes an Internet communication link 106. Network communication link 104 permits communication between computer 20 (including photo manager 22), photo web site 102, and printer 24. Computer 20 is optionally in direct communication to printer 24 via link 105.

Computer 20 includes any portable or desktop computing device having controller 112 and memory 114 for storing and manipulating photos using photo manager 22. Controller 112, in cooperation with user interface 110, supports and coordinates interaction of any one, or all, of functions of photo manager 22. Controller 112 preferably includes hardware, software, firmware or combination of these. In one preferred embodiment, controller 112 includes a microprocessor-based system capable of performing a sequence and logic operation and including memory for storing information. Memory 114 operates in cooperation with controller 112 for storing and retrieving photos, inscriptions, and/or graphics as well as storing photo manager 22.

User interface 110 of computer 20 preferably comprises a graphical user interface including a keypad, touchscreen, remote control, and/or pointing devices for operating the functions of photo manager 22, accessing photos from memory 114, as well as printing photo sheets at printer 24.

Photo manager 22 of the present invention permits access to and selection of photos from memory 114, as well as editing and arranging the photos into a three-dimensional photo configuration. Photo manager 22 includes. photo editor 120, sheet manipulator 122, three-dimensional object selector 124, and inscription and graphics manager 150.

Photo editor 120 of photo manager 22 includes photo index 130, size function 132, shape function 134, quantity function 136, orientation function 138, and location function 140 with sheet specifier 142 and object specifier 144. Photo editor 120 also includes electronic photo templates 146.

Photo index 130 comprises a registry of photos for previewing and accessing photos from memory 114 and viewable through user interface 110 of computer 20. Size, shape, and orientation functions 132, 134, 138, respectively, permit electronically editing each photo, or a group of photos to a desired size, shape, or orientation (e.g., rotations such as 45°, 90°, 180°, or any desired angle) on one or more electronic photo template(s) 146 (e.g., template 30 in FIG. 1). Quantity function 136 selects the number of photos to be arranged on selected template(s) 146 and/or on three-dimensional photo configuration (e.g., photo cube 80 in FIG. 1).

Location function 140 of photo editor 120 with sheet specifier 142 permits a user to place selected photos at particular locations on template 146 for printing as a printed photo sheet. When object specifier 144 of location function 140 is applied, the user selects a desired location on an object (e.g., pyramid, cylinder, etc.) such as a top face of a cube, on which a photo is to be displayed. Later, a photo sheet printed from template 146 will bear that selected photo in an appropriate location on a printed photo sheet so that when sheet, or a portion thereof, is applied to cube, the top face of cube will bear the selected photo.

Sheet manipulator 122 of photo manager 22 includes functions for designating lines on a photo template 146 for manipulation, such as folding, cutting, as well as selecting a shape and size of the sheet. A printed photo sheet produced from arranged template 146 via photo manager 22 optionally will bear non-obtrusive indicators on printed photo sheets corresponding to the electronically placed folding lines or cutting lines.

Three dimensional object selector 124 of photo manager 22 permits a user to select a three-dimensional object onto which photo sheets printed via photo manager 22 will be applied. Upon selection of this object (e.g., cube, pyramid, cylinder), this selector 124 indicates to photo editor 120 how many photo sheets are required, along with their sizes and shapes, in order to yield that three-dimensional photo configuration. Photo editor 120 then provides an appropriate number of sized and shaped electronic photo templates 146 viewable in user interface 110, thereby permitting the user to arrange photos, inscription, and/or graphics as desired to produce the three-dimensional photo configuration. Photo sheets are then printed and applied to the three-dimensional object to render the three dimensional photo configuration.

Three dimensional object selector 124 is also optionally used where no actual object will be used for mounting photo sheets. In this case, once the photo sheets are printed, they are attached to each other at their edges (or other locations) to form a three-dimensional photo configuration that is independent of any solid object.

Inscription and graphics manager 150 of photo manager 22 includes text function 152 with font specifier 154 and size specifier 156, graphic specifier 160, color function 162, shape function 164, location function 166, size function 168, and dialog box 170. Text function 152 permits creating text for inscriptions while graphics specifier 160 permits insertion and/or creation of graphics into photo templates 146. Functions 162, 164, 166, and 168 permit selecting a color, shape, location, and/or size, respectively, of any inscription or graphic on a printed photo sheet. For example, these functions 162, 164, 166, 168 permit creation of a colored border encompassing a periphery of a photo and/or including a text message. Location function 166 includes the capacity to place an inscription box within a photo, so that the inscription becomes a nested portion within a larger photo that surrounds the inscription, or vice versa (as seen in sheet 44 as shown in FIG. 1). Finally, dialog box 170 provides an editing mechanism for carrying out all of functions of photo editor 120 on electronic photo templates 146 and that is accessed via user interface 110.

Figure 3:
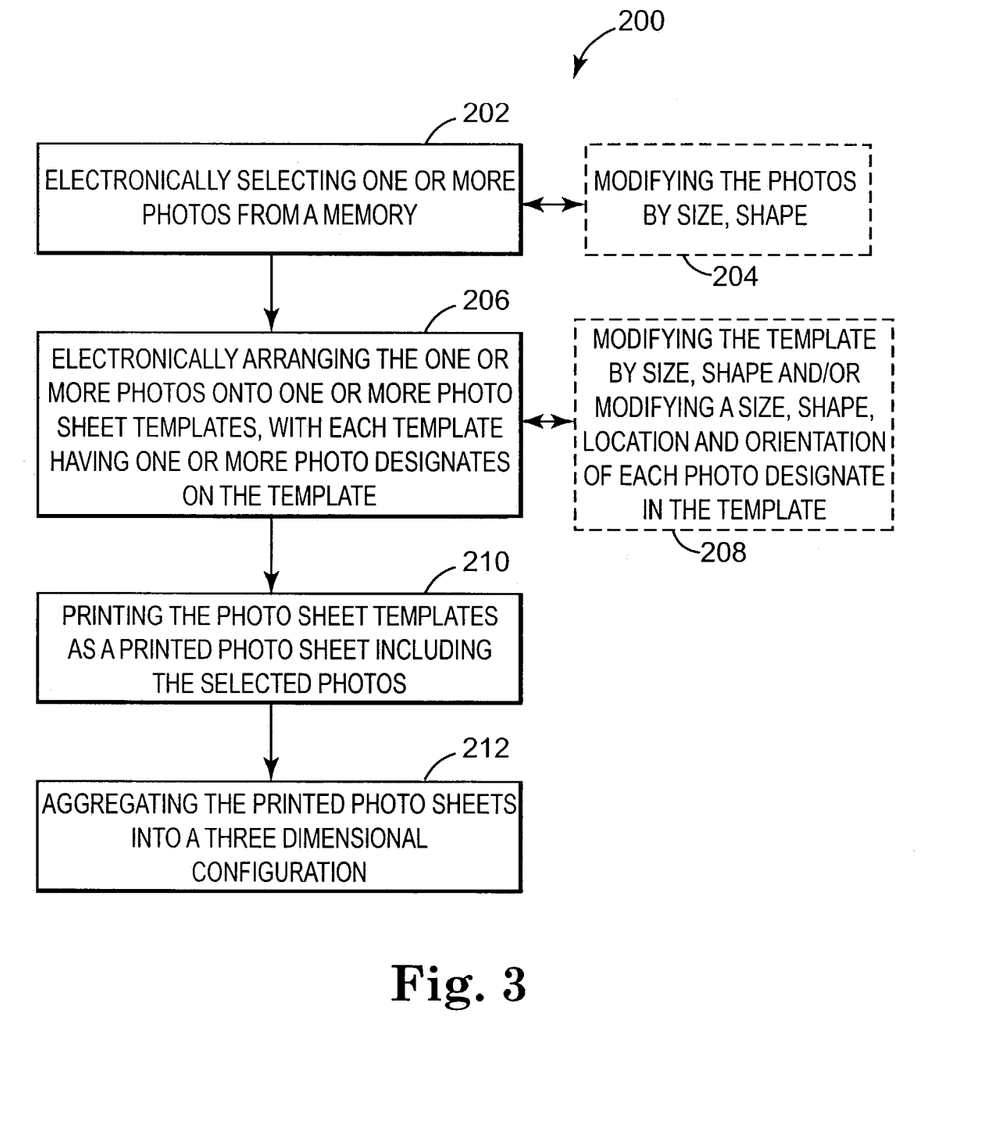
FIG. 3 is flow diagram of a method of managing photos, according to an embodiment of the present invention.

System 100, or portions thereof, are used to perform method 10 (FIG. 1) and method 200 shown in FIG. 3. As shown in FIG. 3, method 200 of the present invention includes electronically selecting one or more photos from a memory (box 202), which optionally further includes modifying a size and/or shape of the photos (box 204). Next, method 200 includes electronically arranging the one or more selected photos onto one or more photo sheet templates 146 (see also template 30 in FIG. 1), with each template 146 having one or more photo designates on the template 146 (box 206). This electronic photo arrangement optionally includes modifying electronic template 146 by its size and/or shape, and/or modifying a size, shape, location and/or orientation of each photo designate on template 146 (box 208). A graphic and/or inscription can be substituted for one or more photos, or combined with a photo, and also can be modified in its size, shape, and/or location.

Next, method 200 includes printing the photo templates as printed photo sheets which bear the arranged photos (box 210). The printed photo sheets are then aggregated into a three dimensional photo configuration, either onto a three-dimensional object or by themselves (box 212). It is to be understood that although the flow chart of FIG. 3 shows a specific order of execution, the order of execution may differ from that what is depicted. All such variations are within the scope of the present invention.

Examples of method 200 will be described in association with FIGS. 4-8, including the aggregation of photo sheets into a variety of three-dimensional photo configurations. However, method 200 is not limited to the particular photo configurations shown in FIGS. 4-8, but extends to an almost limitless array of three-dimensional configurations achievable from printed photo sheets.

Figure 4:
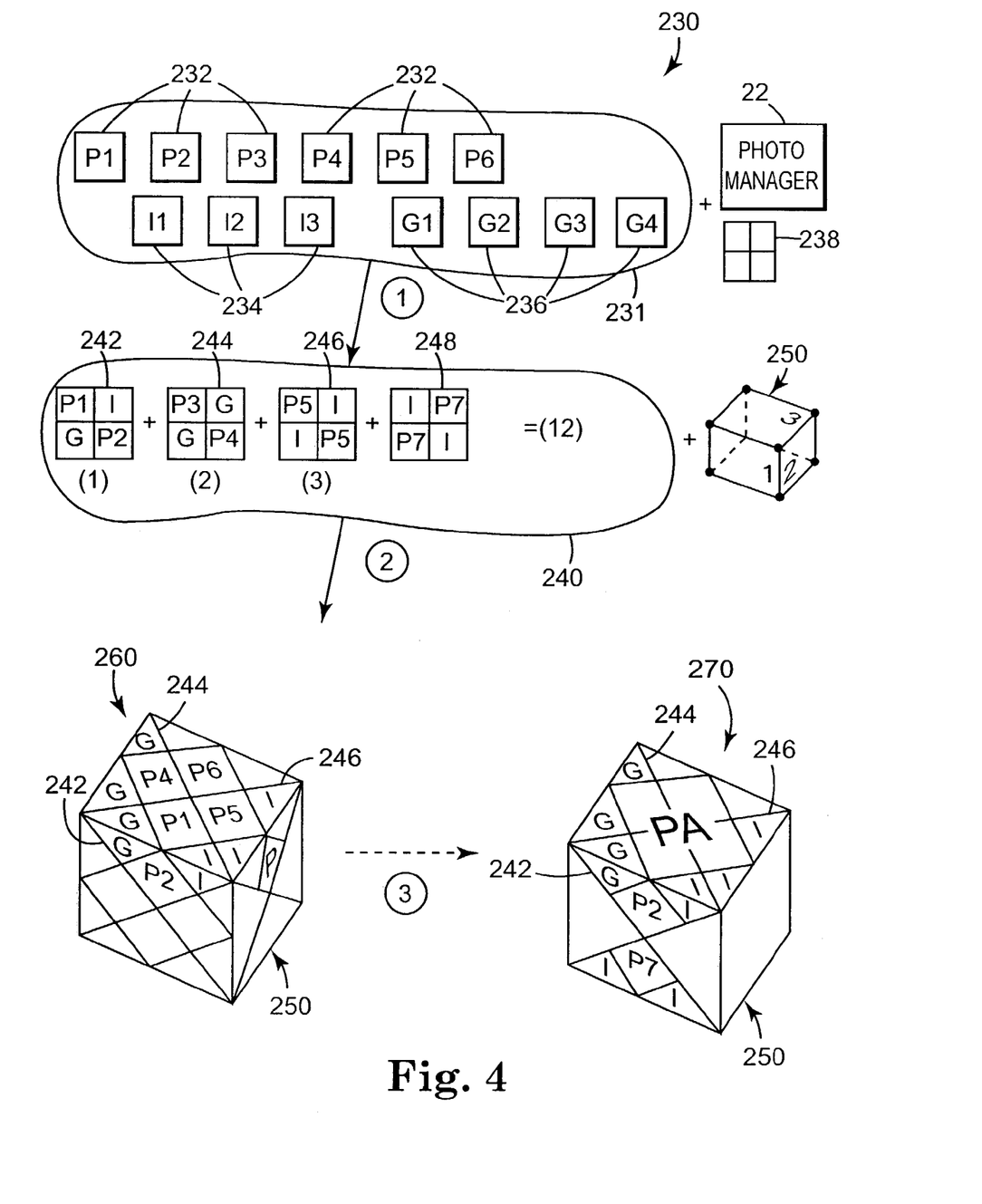
FIG. 4 is a diagram of a method of managing photos, according to an embodiment of the present invention.

As shown in FIG. 4, method 230 of the present invention produces a photo cube from printed photo sheets. As shown by directional arrow 1, method 200 includes using photo manager 22 and set 231 of photos 232, inscriptions 234, and/or graphics 236, to produce a set 240 of twelve printed photo sheets 242, 244, 246, 248, etc. for application to cover all sides of cube 250 to produce three-dimensional photo configuration 260. To do so, photo manager 22 is operated by a user via user interface 110 (FIG. 2) of computer 20 to electronically arrange photos 232 in photo templates 238 with all the functions of photo manager 22 (FIG. 2) regarding a size, shape, location, and orientation of photos, graphics, and inscriptions relative to photo sheets. As also shown by directional arrow 1, printer 24 (FIG. 1) then prints photo sheets 242, 244, etc. from electronic template 238.

As shown by directional arrow 2, printed photo sheets 242, 244, 246, etc. are then aggregated together onto cube 250 to produce photo cube 260.

An optional feature of method 230 is represented by photo display 270 (shown by arrow 3). In particular, in this optional arrangement, photos 232 are optionally selected via photo manager so that P4, P6, P1, and P5 are actually each a portion of a single photo PA. Accordingly, when arranged on cube 250 in the pattern shown in finished photo cube 260, the combination of photos P4, P6, P1 and P5 render a single integrated photo PA on finished photo cube 270.

Figure 5:
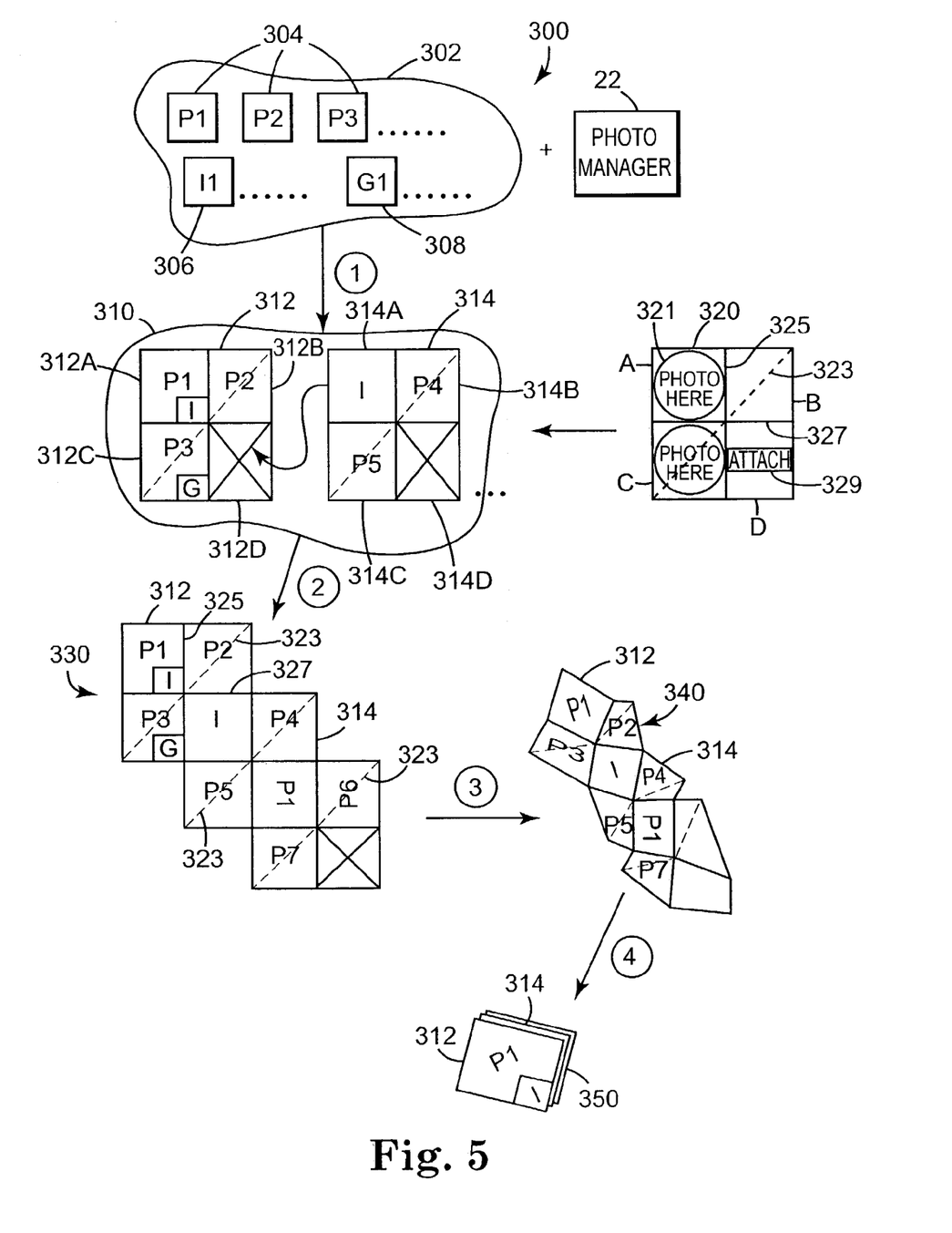
FIG. 5 is a diagram of a method of managing photos, according to an embodiment of the present invention.

As shown in FIG. 5, method 300 of the present invention produces a foldable, expandable mini-scrapbook. As shown by directional arrow 1, method 300 includes using photo manager 22 and set 302 of photos 304, inscriptions 306, and/or graphics 308, to produce set 310 of a plurality of printed photo sheets 312, 314, etc. for aggregation into an expandable three-dimensional photo configuration. To do so, photo manager 22 is operated by a user via user interface 110 (FIG. 2) of computer 20 to electronically arrange photos 232 (FIG. 4) in photo templates 320 using all the functions of photo manager 22 (FIG. 2) regarding a size, shape, location, and orientation of photos, graphics, and inscriptions relative to photo sheets. As also shown by directional arrow 1, printer 24 then prints photo sheets 312, 314, etc. from electronic template 320.

Photo template 320, as used in photo manager 22 to produce printed photo sheets 312, 314, includes photo designates 321, diagonal fold lines 323, vertical fold lines 325, horizontal fold lines 327, and attachment designate 329. Horizontal and vertical fold lines 327, 325, respectively, divide template 320, and consequently sheets 312, 314, into four quadrants 312A, 312B, 312C, 312D and 314A, 314B, 314C, 314D, respectively. In one example, attachment designate 329 is shown as lower right quadrant D of sheet 312, and displayed on printed photo sheet 312 as an X.

Once printed, photo sheets 312, 314 are first prefolded along diagonal lines 323, and both vertical and horizontal lines 325, 327. Diagonal lines 323 are folded inward while vertical and horizontal lines 325, 327 are folded outward, and subsequent sheet 314 has diagonal lines 323 is folded outward and then horizontal/vertical lines 325, 327 are folded inward. Subsequent sheets are folded in likewise alternating fashion.

After prefolding, printed photo sheets 312, 314, are then aggregated together (shown by arrow 2) by placing and attaching first quadrant A of sheet 314 on top of attachment designate 329 (fourth quadrant D) of sheet 312. Sheet 314 is oriented oppositely to sheet 312 regarding its folded lines, with diagonal fold lines 323 of sheet 312 pointing upward and outward, and diagonal fold lines 323 of sheet 314 pointing inward in a recessed fashion. Subsequent sheets are successively attached in alternating fashion like sheets 312 and 314 to produce an extended chain 340 of sheets 312, 314 (shown by arrow 3). Finally, once all sheets have been attached to one another, sheets can be optionally re-folded at diagonal lines 323 and horizontal/vertical lines 325, 327 of each sheet to collapse into a square shaped stack 350 of foldable photo sheets, with each sheet folded on top of one another (shown by directional arrow 4). Of course, stack 350 can readily be expanded to a three dimensional photo configuration as an extended chain 340 of photo sheets by merely lifting upward on top sheet 312 of stack 350.

In alternative arrangements, photo manager 22 is used to specify various attachment designates other than a quadrant (e.g., attachment designate 329 in quadrant D of sheet 312), such as an edge (e.g., top, bottom, side) of sheets 312, 314, and/or interior portions of sheets 312, 314 to render any desired expandable, foldable three-dimensional photo configuration.

Figure 6:
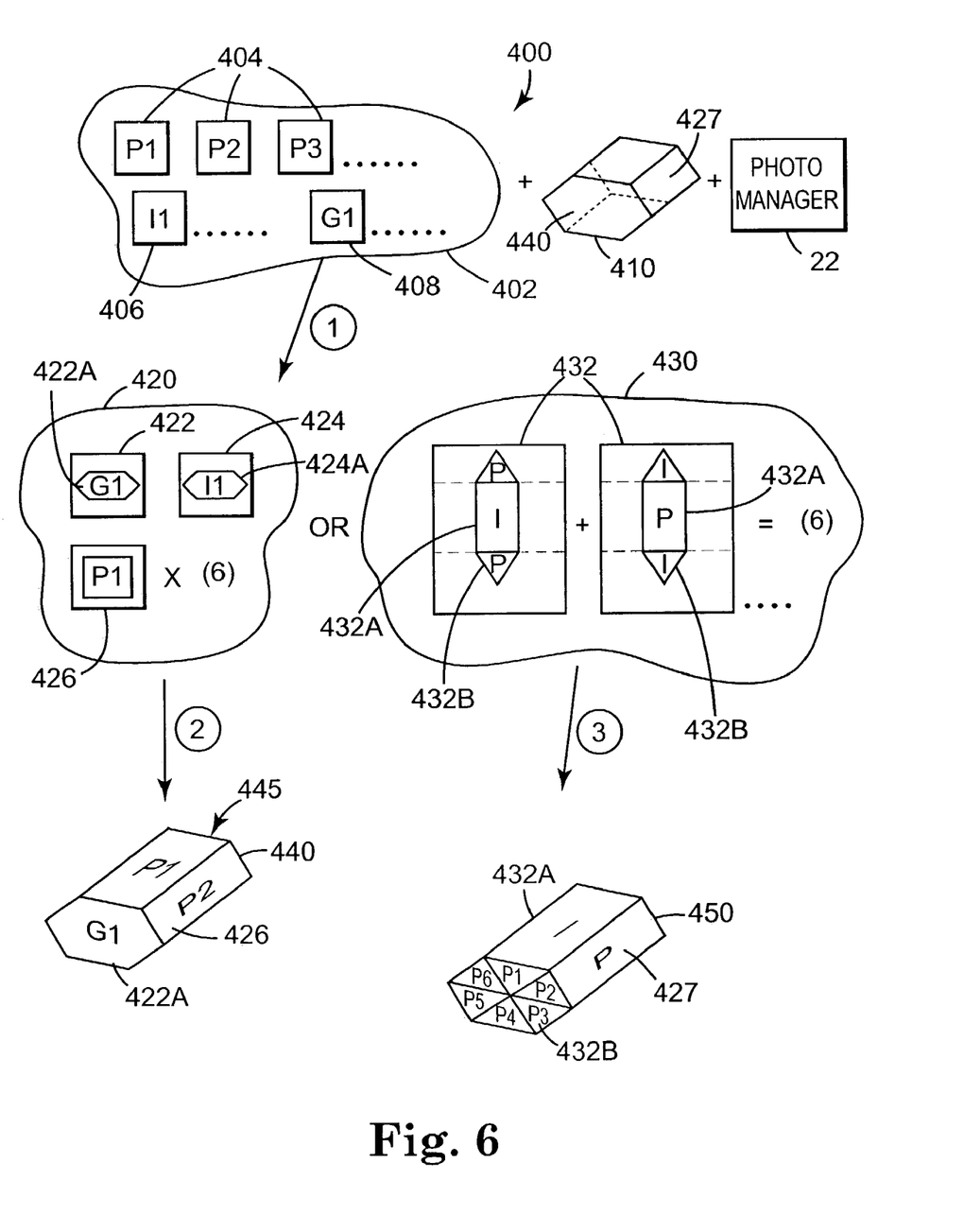
FIG. 6 is diagram of a method of managing photos, according to an embodiment of the present invention.

As shown in FIG. 6, method 400 of the present invention produces a three dimensional hexagonal display. As shown by directional arrow 1, method 400 includes using photo manager 22 and set 402 of photos 404, inscriptions 406, and/or graphics 408, along with a selected three-dimensional object (e.g., three-dimensional hexagonal 410) to produce three dimensional photo configuration 445 or 450. Three-dimensional hexagonal 410 includes sides 427 and ends 440. Using photo manager 22, photo set 402 is arranged electronically onto photo templates 146 (FIG. 1) to produce set 420 of printed photo sheets 422, 424, 426 or set 430 of six printed photo sheets 432. Sheets 422 and 424 include photo portions 422A, 424A respectively. Photo sheet 426 is already dimensioned to substantially match sides 427 of three-dimensional hexagonal 410, or to include a sub-portion that is dimensioned (e.g., sized and shaped) to substantially match side(s) 427 of three-dimensional hexagonal 410.

After printing photo sheets 422, 424, these photo sheets (or trimmed portions thereof) are attached to ends 440 of three-dimensional,hexagonal 410, while six sheets 426, each bearing a photo, inscription, graphic, or combination thereof, are placed on six sides 427 of three-dimensional hexagonal 410. This application produces a three dimensional photo configuration 445 (shown by directional arrow 2). If desired, any side 427 or end 440 of three-dimensional hexagonal 410 optionally can be left uncovered by a printed photo sheet.

In the alternative pathway using set 430 of sheets 432, each sheet 432 is placed so that triangular ends 432B of photo portion 432A are placed on, and partially cover, ends 440 of three-dimensional hexagonal 410 and with body portion 432A of sheets 432 extending therebetween to cover one side 427 of three-dimensional hexagonal 410 (shown by directional arrow 3). Repeating this process with the remaining five sheets results in a combination of triangular portions 432B of adjoining sheets 432 (bearing photos P1-P6) covering ends 440 of three-dimensional hexagon solid 410 and with body portions 432A of sheets 432 covering all sides 427 of three-dimensional hexagonal, as shown by finish photo configuration 450. Photos P1-P6 optionally are selected in the photo templates in photo manager 22 so that when printed on separate photo sheets 432 and then combined in aggregate next to each other on an end 440 of three-dimensional hexagonal 410 they form a single integrated photo image.

Figure 7:
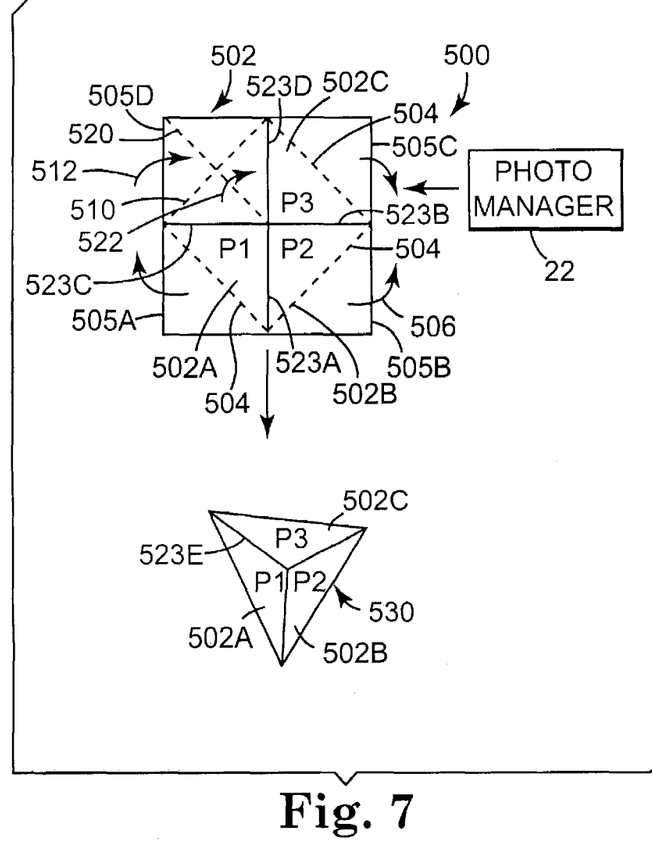
FIG. 7 is a diagram of a method of managing photos, according to an embodiment of the present invention.

As shown in FIG. 7, method 500 of the present invention produces a photo display pyramid 530. Method 500 includes using electronic photo templates 146 (FIG. 2) and any one or all functions of photo manager 22 (e.g., size, shape, location, orientation, etc.) to produce printed photo sheet 502 to yield a photo pyramid directly from sheet 502, independent of a three-dimensional object. Printed photo sheet 502 is produced from an electronic photo template (that appears substantially identical to sheet 502) having photo designates arranged for photos P1, P2, and P3 having the size, shape, and location shown in FIG. 7. In particular, printed photo sheet 502 includes three faces 502A, 502B, and 502C bearing photos P1, P2, P3, respectively, as electronically arranged for shape, size, location, orientation via photo manager 22.

Sheet 502 also includes first fold lines 504 for first, second, and third quadrants 505A, 505B, and 505C, respectively. Directional action arrow 506 shows folding of each of first, second third quadrants at fold lines 504 so that remainder of these quadrants are folded under faces 502A, 502B, 502C, leaving only photos P1, P2, P3 visible as shown in photo pyramid 530.

Sheet 502 also has a fourth quadrant 505D which does not bear a photo. Fourth quadrant 505D includes fold line 510, for folding as indicated by directional action arrow 512 and fold line 520, for folding as indicated by directional action arrow 522. Sheet 502 is also folded along lines 523A, 523B, 523C, and 523D, which separates sheet 502 into four quadrants.

When folding sheet 502 into its three-dimensional configuration, sheet 502 is manipulated by folding about line 520, and about line 510 to thereby draw fold lines 523C and 523 D together to effectively create a single fold line 523E as shown in photo pyramid 530. This arrangement yields a pyramid, with three faces 502A, 502B, 502C bearing photos P1, P2, P3, respectively, on the upper visible faces of the pyramid.

Photo pyramid 530 is merely one example of a three-dimensional configuration produced from printed photo sheets selected and electronically arranged by photo manager of the present invention, as a large number and variety of shaped and sized three-dimensional configurations are possible.

Figure 8:
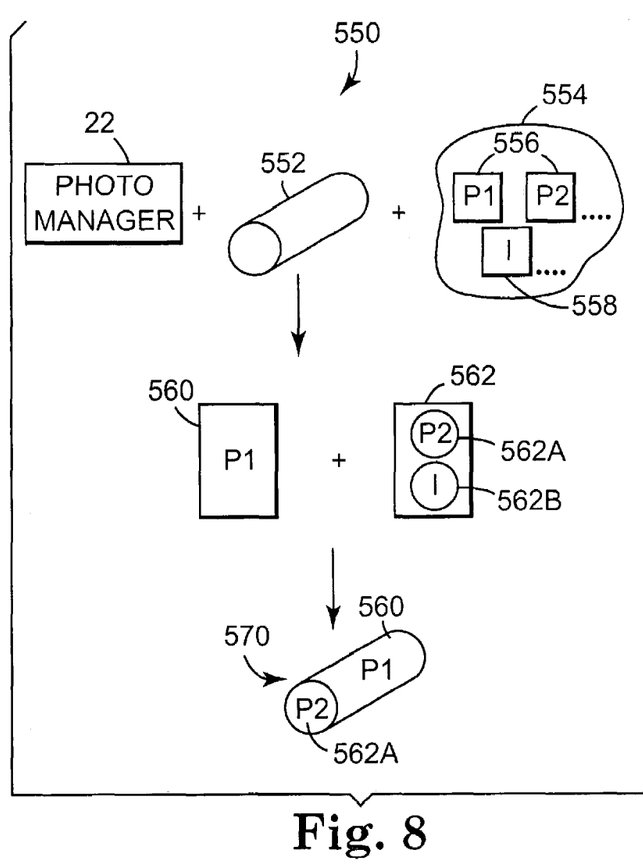
FIG. 8 is a diagram of a method of managing photos, according to an embodiment of the present invention.

As shown in FIG. 8, method 550 of the present invention produces a photo display cylinder 570. Method 550 includes using photo manger 22 (including manipulable electronic templates 146 (FIG. 2)) with set 554 of photos 556 and inscriptions 558 to produce printed photo sheets 560 and 562. Printed photo sheet 560 bears photo P1 and is sized and shaped to encircle a body of a cylinder. Printed photo sheet 562 includes circular portions 562A, 562B bearing photo P2 and inscription I, respectively, each of which are sized and shaped to substantially match the size and circular shape of an end of a cylinder. Printed photo sheet 560 is applied about body of cylinder 552 and circular portions 562A, 562B are applied to ends of cylinder 552 to produce three-dimensional photo cylinder 570.

The same three-dimensional photo configuration 570 is optionally achieved without cylinder 552 by using photo templates from photo manager 22 to produce printed photo sheets 560, 562 and secure them relative to each other (with adhesive, staples, etc.) into the shape and size of cylindrical photo configuration 570.

Figure 9:
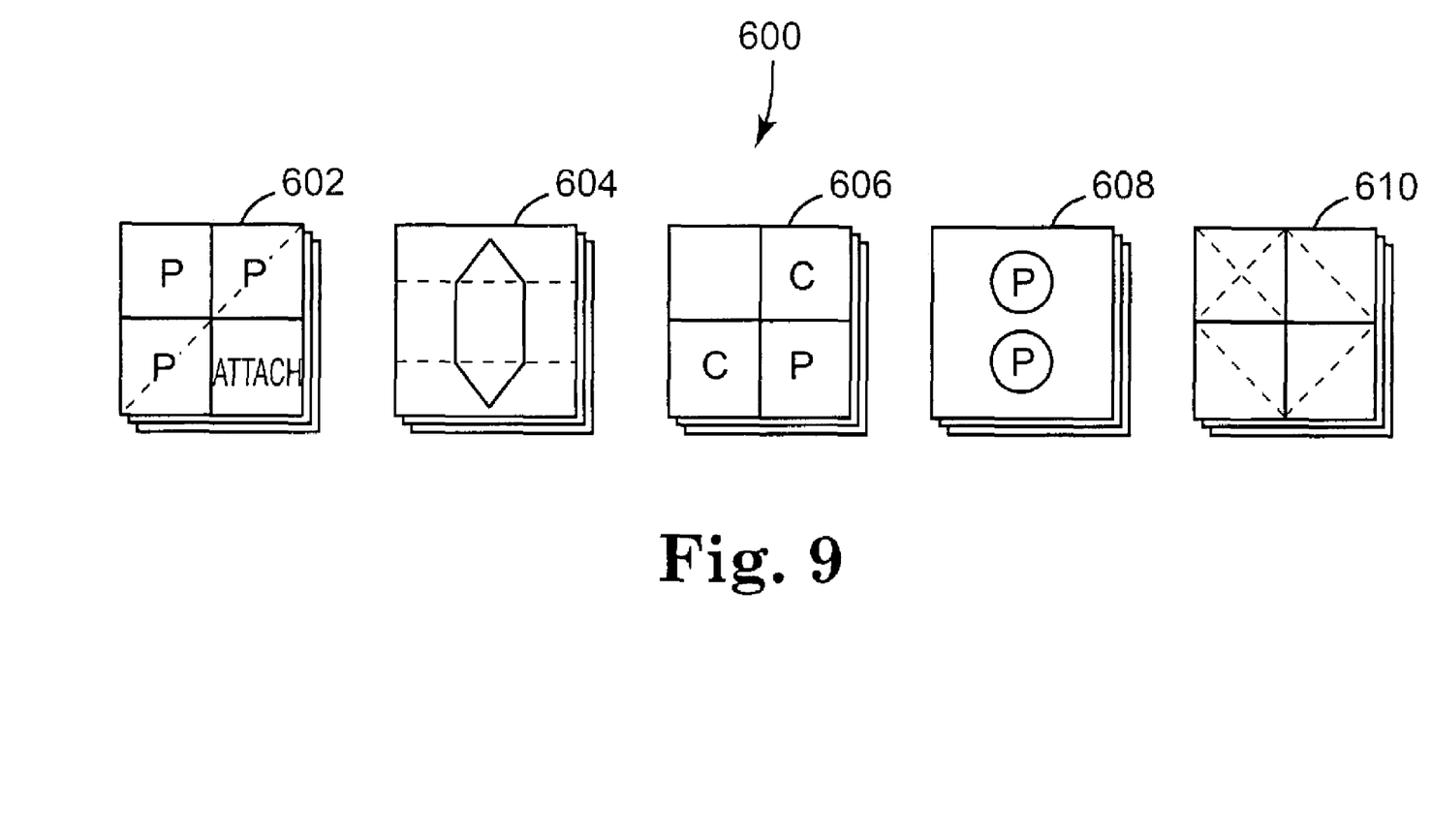
FIG. 9 is a diagram of a photo template system, according to an embodiment of the present invention.

As shown in FIG. 9, system 600 of the present invention of printable photo sheets 602, 604, 606, 608, 610 allows the construction of a variety of three-dimensional photo configurations. These photo sheets generally correspond to electronic photo templates 146 (FIG. 2) used in photo manager 22, having lines marked and/or prepared for folding at appropriate fold lines, so that after application of photo manager 22 to electronically arrange photos in the templates of photo manager 22, photos can be printed on these sheets which are already ready for folding and manipulation. Accordingly, system 600 provides a plurality of configurable printable photo sheets suitable for use with photo manager 22 to print photos on these sheets for manipulation into a three-dimensional configuration, or for merely attaching already printed photos onto these sheets after (or before) manipulation into their three-dimensional configurations.

Finally, photo manager 22 of the present invention, shown in FIG. 2, is optionally made available on a photo web site 102, accessible via user interface 110 of computer 20, and can use photos stored at web site 102 or at computer 20 to produce three dimensional photo configurations in substantially the same manner as described and illustrated in association with FIGS. 1-9.

A system and method of the present invention is directed to electronically arranging photos with a computer and printing them as one or more photo sheets for manipulation into a three-dimensional photo display. The photo display can be foldable, expandable or fixed, and can be embodied in a large variety of shapes and sizes. Prior to printing the photo sheets, inscriptions and/or graphics can be added electronically as a border, text window, and be inserted within, around, beside or instead of photos. Accordingly, consumers are granted new freedoms in arranging and displaying photos on printable photo sheets.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of displaying photos comprising:

electronically selecting a plurality of photos from a memory;

electronically arranging a plurality of electronic photo sheet templates, including arranging the respective photos on the respective templates, into a manipulable configuration for producing a three dimensional photo display;

printing the plurality of electronically arranged photo sheet templates as a plurality of printed photo sheets with each respective printed photo sheet comprising four quadrants, the four quadrants including three photo-bearing quadrants and one non-photo quadrant and two of the photo-bearing quadrants including a fold line and the non-photo quadrant defining an attachment designate; and aggregating the printed photo sheets, without removing any substantial portion of the respective printed photo sheets, into the three dimensional photo display by manipulating each respective printed photo sheet along the fold line of the respective photo-bearing quadrants of each respective printed photo sheet and attaching successive respective printed photo sheets together by attaching a back surface of one of the respective photo-bearing quadrants of one printed photo sheet, in an overlapping relationship, to a front surface of the non-photo quadrant of another respective printed photo sheet, into a chain of attached printed photo sheets movable between a folded configuration in which the attached printed photo sheets are folded against each other in a stacked relationship and an expanded configuration in which the attached printed photo sheets are generally spaced apart from each other.

2. The method of claim 1 wherein aggregating the photo sheets includes:
folding the printed photo sheets along the fold line of the respective photo-bearing quadrants of each respective printed photo sheet to cause the chain of printed photo sheets to have the folded configuration and the expanded configuration, respectively, and wherein the fold line extends across a middle portion of the respective photo-bearing quadrants of the printed photo sheet.

3. The method of claim 1 wherein electronically arranging the plurality of electronic photo sheet templates into a manipulable configuration includes at least one of:
electronically selecting at least one of a size, a shape, an orientation, and a location of the respective photos on the electronic photo sheet template;
electronically creating on the electronic photo sheet template at least one inscription including a text having a location, size, shape, and orientation on the electronic photo sheet template; and
electronically creating on the electronic photo sheet template at least one graphic having a location, a size, a shape, a color, and an orientation on the electronic photo sheet template.

4. A method of photo printing comprising:
electronically selecting a plurality of photos from a memory;
electronically selecting a three dimensional photo configuration including an expanded position and a folded position;
electroncially selecting a plurality of photo templates, that in combination correspond to the three dimensional photo configuration, including selecting at least one of a shape and a size of the photo templates and electronically arranging the respective photos on the photo templates;
printing photo sheets from the electronically arranged photo templates; and
aggregating the respective printed photo sheets, without removing printed portions of the respective printed photo sheets, into the three dimensional photo configuration by connecting successive respective printed photo sheets via connecting a back surface of a photo-bearing portion of one respective printed photo sheet to a front surface of a non-photo portion of another respective printed photo sheet in an overlapping relationship to produce the folded position in which the connected printed photo sheets form a chain of printed photo sheets that are foldable against each other into a stacked relationship and the expanded position in which the connected printed photo sheets are unfolded to be generally spaced apart from each other, wherein a size and shape of the each respective non-photo portion is substantially the same as a size and shape of each respective photo-bearing portion.

5. The method of claim 4 wherein electronically selecting the templates comprises:
electronically creating a folding scheme to produce the three dimensional photo configuration, including selecting at least one of an orientation, a location, a size, and a shape of a plurality of fold lines for each printed photo sheet,
wherein electronically arranging the respective photos on the photo templates comprises defining four quadrants including three photo-bearing quadrants and one non-photo quadrant, wherein two of the photo-bearing quadrants include a fold line and the non-photo quadrant defines an attachment designate,
wherein aggregating the printed photo sheets comprises arranging the respective printed photo sheets into the three dimensional photo configuration via:
attaching successive respective printed photo sheets together by attaching a back portion of one of the respective photo-bearing quadrants of one printed photo sheet, in an overlapping relationship, to a top portion of the attachment designate of the non-photo quadrant of another respective printed photo sheet; and
folding the respective printed photo sheets along the plurality of fold lines of each respective printed photo sheet.

6. The method of claim 5 wherein the non-photo quadrant defines the non-photo portion and one of the respective photo-bearing quadrant is positioned diagonal to the non-photo portion and defines the photo-bearing portion to which the non-photo portion is connected.

7. A photo manager comprising:
an electronic photo editor configured and arranged to select a plurality of photos and arrange the photos by at least one of a size, a shape, an orientation, and a location on an electronic photo template to produce a plurality of printed photo sheets; and
an electronic photo sheet manipulator configured and arranged to specify a size and a shape of the electronic photo template, and including:
a selector configured to select a fold line on the electronic photo template to produce a three dimensional photo configuration from the respective printed photo sheets; and
a designator configured to designate an attachment location for each respective printed photo sheet at which a back surface of a photo-bearing portion of one respective printed photo sheet is connected to a front surface of a non-photo portion of another respective printed photo sheet an overlapping relationship to form a final assembly including a series of printed photo sheets manipulable into a folded arrangement in which the connected printed photo sheets are folded against each other in a stacked relationship and an expanded arrangement in which the connected printed photo sheets are unfolded to be spaced apart from each other,
wherein a size and shape of the each respective non-photo portion is substantially the same as a size and shape of each respective photo-bearing portion,
further wherein the final assembly is achieved without removing printed portions of the respective printed photo sheets.

8. The photo manager of claim 7 comprising:
an electronic inscription and graphics manager configured and arranged to create at least one of a text and a graphic for disposition on the electronic photo template, and including at least one of a font function, a size function, a color function, a shape function, and a location function.

9. The photo manager of claim 7 and further comprising a system comprising:
a computer including a memory configured to store the photo manager and to store a plurality of photos and photo templates; and
a printer configured to print the photo sheets.

10. A printable three dimensional photo display system, the system comprising:
a plurality of printed sheets, each printed sheet including:
a plurality of manipulation lines;
a first attachment designate located at back surface of one respective printed sheet and a second attachment designate located at a front surface of another respective printed sheet, the first attachment designate and the second attachment designate positioned to attach successive respective printable sheets to each other in an overlapping relationship to form a final assembly including a chain of printable sheets and positioned in association with the respective manipulation lines to enable folding and unfolding, respectively, of the chain of printable sheets between a stacked, folded position and an expanded, unfolded position, wherein the final assembly is achieved without removing printed portions of the respective printed sheets, further wherein a size and shape of the first attachment designate is substantially the same as a size and shape of and the second attachment designate; and
a plurality of photo designates,
wherein at least one of a size, a shape, a location, and orientation of the manipulation lines and of the photo designates correspond to a three dimensional configuration; and
means for attaching one or more photos to each respective printable sheet at the location of the photo designates for each respective printable sheet.

11. The photo display system of claim 10 wherein each respective printed sheet comprises a plurality of manipulation marker sets, with each set being defined by at least one of a color and a symbolic pattern, so that single template can be used to form a plurality of three dimensional objects.

12. A computer-readable medium having computer-executable instructions for performing a method of displaying photos, the method comprising:
electronically selecting a plurality of photos from a memory;
electronically arranging a plurality of electronic photo sheet templates, including arranging the respective photos on the respective templates, into a manipulable configuration for producing a three dimensional photo display;
printing the plurality of electronically arranged photo sheet templates as a plurality of printed photo sheets with each respective printed photo sheet comprising four quadrants, the four quadrants including three photo-bearing quadrants and one non-photo quadrant and two of the photo-bearing quadrants including a fold line and the non-photo quadrant defining an attachment designate; and aggregating the printed photo sheets into the three dimensional photo display by manipulating each respective printed photo sheet along the fold line of the respective photo-bearing quadrants of each respective printed photo sheet and attaching successive respective printed photo sheets together by attaching a back portion of one of the respective photo-bearing quadrants of one printed photo sheet, in an overlapping relationship, to a top portion of the attachment designate of the non-photo quadrant of another respective printed photo sheet, into a chain of attached printed photo sheets movable between a folded configuration in which the attached printed photo sheets are folded against each other in a stacked relationship and an expanded configuration in which the attached printed photo sheets are generally spaced apart from each other.

13. The medium of claim 12 wherein electronically arranging the plurality of electronic photo sheet templates into a manipulable configuration includes at least one of:
electronically selecting at least one of a size, a shape, an orientation, and a location of the respective photos on the electronic photo sheet template;
electronically creating on the electronic photo sheet template at least one inscription including a text having a location, size, shape, and orientation on the electronic photo sheet template; and
electronically creating on the electronic photo sheet template at least one graphic having a location, a size, a shape, a color, and an orientation on the electronic photo sheet template.

14. A computer-readable medium having computer-executable instructions for performing a method of photo printing comprising:
electronically selecting a plurality of photos from a memory;
electronically selecting a three dimensional photo configuration including an expanded position and a folded position;
electroncially selecting a plurality of photo templates, that in combination correspond to the three dimensional photo configuration, including selecting at least one of a shape and a size of the photo templates and electronically arranging the respective photos on the photo templates;
printing photo sheets from the electronically arranged photo templates; and
aggregating the respective printed photo sheets, without removing printed portions of the respective printed photo sheets, into the three dimensional photo configuration by connecting successive respective printed photo sheets by connecting a back non-photo portion of one respective printed photo sheet to a top non-photo portion of another respective printed photo sheet in an overlapping relationship to produce the folded position in which the connected printed photo sheets form a chain of printed photo sheets that are foldable against each other into a stacked relationship and the expanded position in which the connected printed photo sheets are unfolded to be generally spaced apart from each other, wherein a size and shape of the each respective non-photo portion is substantially the same as a size and shape of each respective photo-bearing portion.

15. The medium of claim 14 wherein electronically selecting the plurality of templates comprises at least one of:
electronically creating a folding scheme to produce the three dimensional photo configuration, including selecting at least one of an orientation, a location, a size, and a shape of a plurality of fold lines for each printed photo sheet, wherein electronically arranging the respective photos on the photo templates comprises defining four quadrants including three photo-bearing quadrants and one non-photo quadrant, wherein two of the photo-bearing quadrants include a fold line and the non-photo quadrant defines an attachment designate, wherein aggregating the printed photo sheets comprises arranging the respective printed photo sheets into the three dimensional photo configuration via:

attaching successive respective printed photo sheets together by attaching a back portion of one of the respective photo-bearing quadrants of one printed photo sheet, in an overlapping relationship, to a top portion of the attachment designate of the non-photo quadrant of another respective printed photo sheet; and folding the respective printed photo sheets along the plurality of fold lines of each respective printed photo sheet.

* * * * *

UNITED STATES PATENT AND TRADEMARK OFFICE
CERTIFICATE OF CORRECTION

| | | |
|---|---|---|
| PATENT NO. | : 7,385,724 B2 | Page 1 of 1 |
| APPLICATION NO. | : 10/400036 | |
| DATED | : June 10, 2008 | |
| INVENTOR(S) | : Rebecca Brown | |

It is certified that error appears in the above-identified patent and that said Letters Patent is hereby corrected as shown below:

In column 1, line 15, after "photo" delete ",".

In column 8, line 46, delete "three-dimensional,hexagonal" and insert
-- three-dimensional hexagonal --, therefor.

In column 11, line 47, in Claim 4, delete "electroncially" and insert -- electronically --, therefor.

In column 14, line 40, in Claim 14, delete "electroncially" and insert -- electronically --, therefor.

Signed and Sealed this

Eighteenth Day of August, 2009

David J. Kappos
*Director of the United States Patent and Trademark Office*